Figure 1:
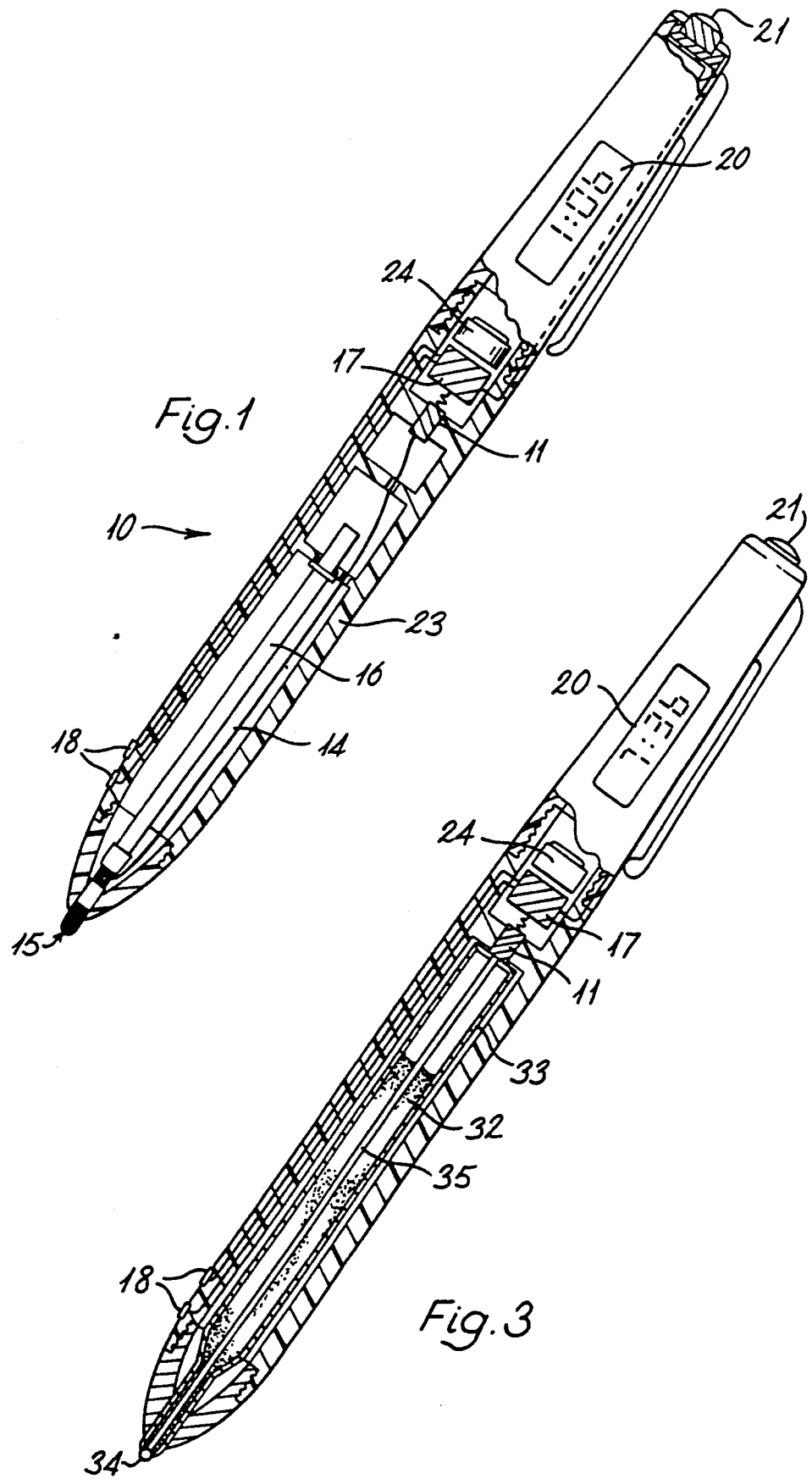

United States Patent [19]
Howell et al.

[11] Patent Number: 5,226,091
[45] Date of Patent: Jul. 6, 1993

[54] METHOD AND APPARATUS FOR CAPTURING INFORMATION IN DRAWING OR WRITING

[76] Inventors: David N. L. Howell, Anel Gate, Jubillee Drive, Colwall, Malvern, Worcestershire WR13 6DQ; Colin S. Hilton, 20 Harrier House, Falcon Road, Battersea - London SW11 2NW; John S. Bridle, 14 Cranford Close, Woodmancote, Bishops Cleeve, Cheltenham, Gloucestershire, GL52 4QA; Roger K. Moore, 14 Old Wyche Road, Malvern, Worcestershire, WR14 4EP; Martin J. Russell, 34 Nathan Road, West Malvern, Worcestershire WR14 4BJ, all of England

[21] Appl. No.: 877,232
[22] Filed: May 1, 1992

Related U.S. Application Data

[63] Continuation of Ser. No. 610,908, Nov. 9, 1990, abandoned, which is a continuation-in-part of Ser. No. 548,192, Jul. 5, 1990, Pat. No. 5,107,541, which is a continuation of Ser. No. 137,676, Dec. 24, 1987, abandoned, which is a continuation-in-part of Ser. No. 76,209, Jun. 30, 1987, abandoned.

[30] Foreign Application Priority Data

Nov. 5, 1985 [GB] United Kingdom ............... 8527265
Nov. 25, 1985 [GB] United Kingdom ............... 8528931
Mar. 24, 1986 [GB] United Kingdom ............... 8607207
Nov. 10, 1989 [GB] United Kingdom ............... 8925479

[51] Int. Cl.$^5$ ............................................. G06K 9/00
[52] U.S. Cl. ....................................... 382/3; 382/13; 382/56
[58] Field of Search ................. 382/3, 13, 56, 54; 178/18, 19, 20

[56] References Cited

U.S. PATENT DOCUMENTS

| | | | |
|---|---|---|---|
| 3,818,443 | 6/1974 | Radcliffe | 382/3 |
| 4,020,463 | 4/1977 | Himmel | 382/3 |
| 4,553,258 | 11/1985 | Chainer et al. | 382/3 |
| 4,581,482 | 4/1986 | Rothfjell | 382/3 |
| 4,764,972 | 8/1988 | Yoshida et al. | 382/13 |
| 4,901,258 | 2/1990 | Bechet | 382/3 |

FOREIGN PATENT DOCUMENTS 2183071 5/1987 United Kingdom.

OTHER PUBLICATIONS

M. Hanan et al, Finite State Machine Decision Procedure Model for Signature Verification, IBM Technical Disclosure Bulletin, Jan. 1978, pp. 3355-3360.
R. T. Gallagher, Signature Verifier Exploits Writing Speed, Electronics International, Jul. 1983, pp. 86, 90.
R. Nag et al, Script Recognition Using Hidden Markov Models, Proceedings of the IEEE-IECEJ-ASJ International Conference on Acoustics, Spech, and Signal Processing, Apr. 1986, pp. 2071-2074.
D. Ibrahim et al, Improved Security Through On-Line Signature Recognition, EURO IFIP 79, Proceedings of European Conference on Applied Information Technology ... 25-28 Sep. 1979, pp. 491-498.
T. Sakai et al, Multi-Feature Display of On-Line Signature by Color TV Display, Proceedings of the 2nd Int'l Joint Conference on Pattern ..., 13-15 Aug. 1974, pp. 303-304.

*Primary Examiner*—Joseph Mancuso
*Attorney, Agent, or Firm*—Cushman, Darby & Cushman

[57] ABSTRACT

A signature to be verified is written on an area which carries horizontal and vertical lines using a pen. As the lines are crossed signals representative of the vertical and horizontal components of the pen tip velocity and whether the tip is in contact with the area are passed to a computer. A hidden Markov model derived from vertical and horizontal velocities and a "contact" signal occurring as a number of authentic signatures are written is stored by the computer. A forward pass of the Baum-Welch algorithm is used to calculate the probability that the vertical and horizontal components of the pen tip and the contacts between pen tip and the writing area could have been produced from the hidden Markov model. This probability is used to decide whether the signature is authentic. The hidden Markov model stored by the computer is derived from an initial model based on pen tip velocities and contacts occurring in an authentic signature, and re-estimation carried out using forward and backward passes of the Baum-Welch algorithm and velocities and contacts from further authentic signatures.

27 Claims, 7 Drawing Sheets

METHOD AND APPARATUS FOR CAPTURING INFORMATION IN DRAWING OR WRITING

This is a continuation of Application Ser. No. 07/610,908, filed Nov. 9, 1990, now abandoned, which is a continuation-in-part of Ser. No. 07/548,192 filed Jul. 5, 1990, now U.S. Pat. No. 5,107,341, which is a continuation of 07/137,676, filed Dec. 24, 1987, abandoned which was a continuation-in-part of Ser. No. 07/076,209, filed Jun. 30, 1987, abandoned and PCT/GB86/00681, filed Nov. 5, 1986.

The present invention relates to methods and apparatus for generating signals as writing or drawing is carried out, the signals being dependent on the way in which the writing or drawing is carried out. The invention also relates to methods and apparatus for signature verification both automatically and as an aid to verification carried out by a person.

Signature verification methods are known in which the dynamic characteristics of the signature (characteristics obtained while the signature is being written) are used in signature verification. The present invention is expected to be particularly useful in such signature verification systems, these systems being of application to monetary transfers and data entry, for example.

Apparatus for identifying characteristics of handwriting by moving a pen across a ridged writing surface is described in U.S. Pat. No. 4,122,435 and similar apparatus for signature verification is described in U.S. Pat. No. 3,955,178. The same principle is used in the signature verifier described in the IBM Technical Disclosure Bulletin, Volume 18, No. 7, December 1975. A disadvantage of this method is the complexity of equipment required to sense the vibrations set up when the pen crosses a groove.

A known alternative which also suffers from the disadvantage of complexity is passing electrical signals into a grid of electrical conductors, the signals being representative in some way of the position of a conductor in the grid, and sensing signals using a pen whose position is to be determined. An example of such apparatus is described in U.S. Pat. No. 4,560,830. Other alternatives are described in European Patent Specifications 0132241 and 0035036.

According to a first aspect of the present invention there is provided a method of obtaining information as writing or drawing is carried out, comprising the steps of writing or drawing in relation to a surface marked in a predetermined way using a tip of an instrument which causes a trail to be left which can be traced later, continually sensing for the tip crossing any of the marks, the sensing being carried out electromagnetically, and analysing the mark crossings on a temporal basis.

The main advantages of this method are that a visual trace of any writing carried out is left so that, if necessary, it can be checked later by eye; and that temporal analysis allows the writing instrument, processor and paperwork to be simple and inexpensive. Temporal analysis also has advantages as far as signature recognition is concerned: the dynamic features of a signature can be recognised and the signature cannot usually be reconstructed.

Sensing may be carried out by receiving electromagnetic radiation, visible or invisible, which is modulated when a said line is crossed. The modulation may, for example, occur either by interruption if light is transmitted through the surface, or by reflection if light is reflected from the surface. Alternatively sensing may be carried out by electromagnetic induction when the lines are formed by material which has substantial magnetic properties and the instrument contains means for detecting such material.

Radiation sensed may be used to derive a representative signal in the writing instrument, or the radiation may be transmitted by way of an optical fibre, for example, to a sensor elsewhere.

The tip may be out of contact with the surface when writing or drawing is carried out but preferably it is in contact with the surface and cooperates with the surface to leave a trail which can be traced later. To this end the tip may dispense ink or a pencil lead type material (either of which can be visible or invisible) or the surface may be such that the tip marks the paper either visibly or invisibly, for example by the use of paper containing material which is released when pressure is applied, conventional carbon paper or similar papers or by the use of a surface such as, or similar to, slate or wax which is marked by the tip.

Where ink or a pencil lead like substance is used and sensing mark crossings depends on receiving electromagnetic radiation, either any ink or pencil-like substance chosen is transparent or translucent to the radiation but not to the marks on the surface, or the light receiver is positioned to prevent the radiation received being substantially interrupted by ink or a pencil lead-type substance dispensed by the tip.

Where ink is used which is not visible in ambient light, it may be of the type which can be seen in electromagnetic radiation of appropriate wavelength or of a type which can be developed by application of a suitable developer or by heating.

The marks on the surface may or may not be visible depending, for example, on their position or on the wavelengths of light interrupted by crossing lines. The marks may be lines and when lines are used there is preferably at least one set of the said lines in which the lines are parallel to one another.

In another example of the invention the writing instrument may contain, as before, a light sensitive device but the surface may be illuminated by light having a particular wavelength either from above or below so reducing spurious modulation of ambient light received in sensing line crossings. As an alternative in overcoming spurious modulation, light from the source may be chopped at a particular frequency and the light sensitive device may include a filter to extract a signal at this frequency.

In an alternative embodiment the writing instrument may contain a light source and the surface, except for the lines, may be transparent or translucent to the light, and the method then including receiving light passed from the writing instrument through the surface, or reflected from the surface, while writing or drawing is carried out.

According to a second aspect of the present invention there is provided a writing instrument comprising a tip for the instrument which interacts with a surface on which writing or drawing is carried out to allow the path of the instrument to be traced after the instrument has been removed, and a light source and/or light sensitive device, for transmitting or receiving light from the surface at the point where the said tip makes contact with the surface.

An advantage of such a writing instrument is that since light is transmitted or received where the tip makes contact, accurate data sensing results because there is no displacement or parallax between the sensing point and the tip.

Preferably the tip is formed by a spherical transparent ball point, such as glass, or suitable gem-stone material, which forms a convex-convex lens which greatly enhances light pick up at the point of contact. The instrument may then include a light guide between the ball point and the light sensitive device.

The tip may dispense an ink or equivalent as described above or it may be suitable for marking a surface by indentation or by releasing material in, or under, the surface.

The writing instrument may contain a circuit connected to the light sensitive device for storing and/or analysing signals received from the light sensitive device. Where signals are stored the instrument may include means for transmitting signals to a receiver when predetermined actions have been completed by a user, for example either periodically or when an item of writing such as a signature has been completed. The means for transmitting signals may include electrodes adapted to make contact with an interface when the instrument is placed in a certain position or the interface may, for example, employ electromagnetic or ultrasonic coupling. Alternatively signals from the light sensitive device may, after storage, or during generation, be passed from the writing instrument to an analyser by way of a connection or by way of a sonic or ultrasonic link or by way of a radiative link employing, for example, infra-red signals or radio signals.

Means (separate from the light sensitive device) for receiving signals may also be included in the writing instrument to allow information held by the instrument to be updated. The updated information may be displayed by the instrument and updating may be subject to satisfactory signature or other validation.

Information for display or to reprogram the analysing circuit may be passed to the instrument by modulating light from a source which illuminates the writing or drawing surface.

In addition the writing instrument may contain means for indicating the result of analysis carried out by the circuit contained by the pen and/or means for manually changing operations carried out by the circuit.

The circuit may be programmed and/or constructed to allow changes in function to be carried out by means of signals transmitted by light by way of the tip. Such signals may be generated by recognition by the pen of characters written or by sweeping the pen over a pattern of lines, for example a bar code.

The writing instrument may have a reservoir for ink and a valve for allowing ink to flow over the tip from the reservoir when pressure is applied to the tip.

According to a third aspect of the present invention there is provided apparatus for use in obtaining information when writing or drawing is carried out using a writing instrument which transmits electromagnetic radiation through a writing tip, the apparatus comprising a surface on which writing or drawing can be carried out or on which material for writing or drawing can be placed, and means for receiving light from the said tip either by way of reflection from the surface or from material placed on the surface, or by transmission through the surface or the said material, the surface containing marks which are at least partially opaque to light from the tip if the surface is intended for writing or drawing.

Preferably, in this form of the invention, the surface is transparent or translucent and the light sensitive device is positioned at the side of a sheet forming the surface or below the said surface where it can receive light from substantially the whole of the area containing the said marks.

According to a fourth aspect of the present invention there is provided a method of analysing drawing or writing comprising using an instrument to draw or write on a surface containing marks, deriving, within the instrument, a signal indicative of the occurrence of mark crossings while drawing or writing is carried out, and analysing the said signal.

According to a fifth aspect of the present invention there is provided a writing instrument comprising means for sensing mark crossings made by a tip of the instrument on a surface containing marks, and means for deriving a signal representative of the said crossings.

The invention includes apparatus corresponding to the method of the fourth aspect of the invention and methods corresponding to the fifth aspect.

Automatic signature verification has uses in financial transactions, for example with cheques and smart cards, and in providing access to facilities, such as computers, or premises. There are of course many other instances of signature use both past and future which benefit from automatic signature recognition.

In known signature verification apparatus the signatory signs on an electronic input device, numerous types of which are known operating on several different principles. Some operate on the principle described in U.K. Pat. No. 1,310,683 and U.S. Pat. No. 3,885,097 to provide x,y coordinates of points in the signature, and others use a noise generated while the signature is written to provide information for signature recognition. The signatory may, instead, use an apparatus or method of the above aspects of the present invention to provide such features as variations in speed at which different parts of a signature are written.

Hidden Markov modelling is a technique that has been used for modelling events that are assumed to have been generated by a statistical process. Hidden Markov Models (HMMs) have been used to model many systems. For example, biological populations, musical styles but in particular HMMs have been used to model speech and natural language. A suggestion that HMMs might be used for signature recognition has been made in the paper "Handwritten Script Recognition Using HMMs" by R. Nag, K. H. Wong and F. Fallside, ICASSP 86, Tokyo, pages 132 to 135. This paper is mainly concerned with recognising handwritten characters by constructing HMMs based on the inclination of script at different points in the characters. HMMs for signature recognition are also briefly mentioned in the above mentioned U.K. Specification No. 2183071.

An HMM is a class of finite state machine in which the output from a particular state is chosen by sampling from possible values with probability governed by probability distribution function(s) (pdf). Such a machine generates a series of outputs, each of which is dependent upon its current internal state. The transition from one state to another is dependent on a set of transition probabilities.

According to a sixth aspect of the present invention there is provided a method of automatic signature verification comprising, for each signatory, the steps of forming a finite state machine particular to the signatures of that signatory based on corresponding measurements of a plurality of signatures from that signatory, at least one of the measurements on each signature being of a feature which is only apparent from values occurring at the time the signature was written, and using the finite state machine to verify signatures alleged to be written by the signatory.

According to a seventh aspect of the present invention there is provided apparatus for signature verification comprising means for deriving and storing a finite state machine for the signature of each person whose signature is to be recognised by the apparatus, each said machine being based on corresponding measurements on a plurality of signatures from that person, and at least one of the measurements of each signature being of a feature which is only apparent from values occurring at the time the signature was written, and means for verifying signatures based on the stored finite state machines.

Usually the finite state machines are HMMs.

By deriving at least some of the states of the HMMs from dynamic signature features, that is features apparent from values occurring at the time a signature is written, forgery is made much more difficult since in addition to achieving a signature which appears correct, the forger has to mimic dynamic features which are unknown to him.

The HMM states may, for example, be based on Cartesian components of the velocity at which the tip of a pen used in signing travels as different segments of the signature are written, each segment corresponding to a state in the HMM. Thus in each HMM the state pdfs may represent distributions of pen velocity components occurring in writing signatures. Static features may be combined with dynamic features in constructing the HMMs.

The invention also relates to methods and apparatus for deriving finite state machines representing signatures wherein at least one of the states of the machine for a signature is based on a dynamic feature of that signature. Methods and apparatus for verifying signatures from stored finite state machines, where each of the said machines is based on a dynamic feature of a signature, form further aspects of the invention.

Each person whose signature is to be recognised writes his signature several times using a pen such as that mentioned in the previous paragraph, and a programmed computer derives an HMM by dividing each signature into segments and using the forward-backward algorithm to re-estimate an initial HMM based on orthogonal components of pen velocity in the segments. Preferably each signature is divided into between thirty and a hundred segments, typically fifty, in deriving the corresponding HMM. The number of states in the HMM usually equals the number of segments used to derive it. An HMM for each person's signature is stored for use when signatures are to be recognised.

To verify a signature, the signature is automatically matched against the stored HMM derived from signatures of the person alleged to be the author of the signature by calculating the logarithm of the likelihood of the model generating the signature to be verified. The likelihood value is calculated by a forward probability or "alpha" pass through the model.

According to an eighth aspect of the invention there is provided a method of verifying a signature comprising regenerating a signature from a finite state machine model of the signature, and comparing the regenerated signature with a trial signature to be verified in rejecting or accepting the trial signature.

According to a ninth aspect of the invention there is provided apparatus for use in signature verification comprising means for storing data defining the states of a finite state machine model of a signature, and means for generating a display of a representation of the signature from at least some of the said data, whereby a signature to be verified can be compared with the said representation.

The comparison between the displayed representation and the signature to be verified can be carried out either by a person or automatically.

Figure 2:
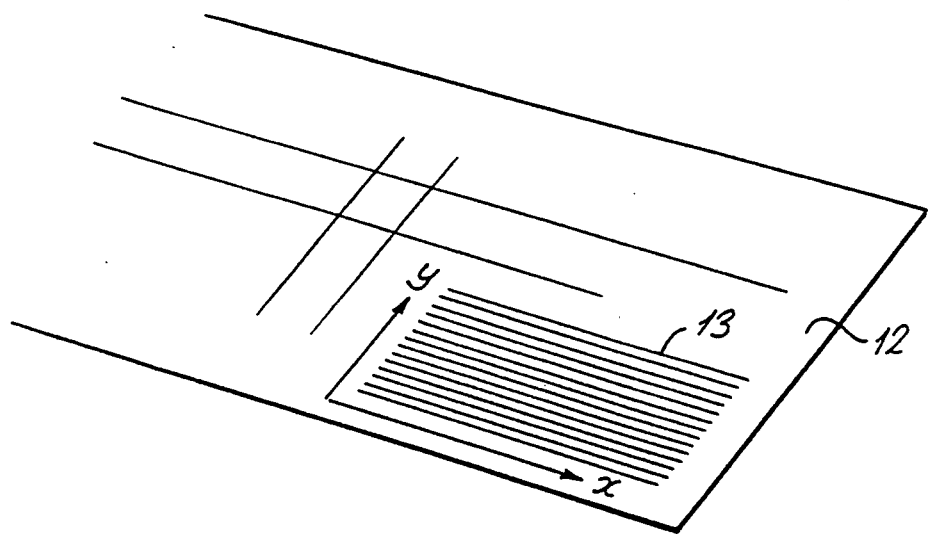
Figure 4:
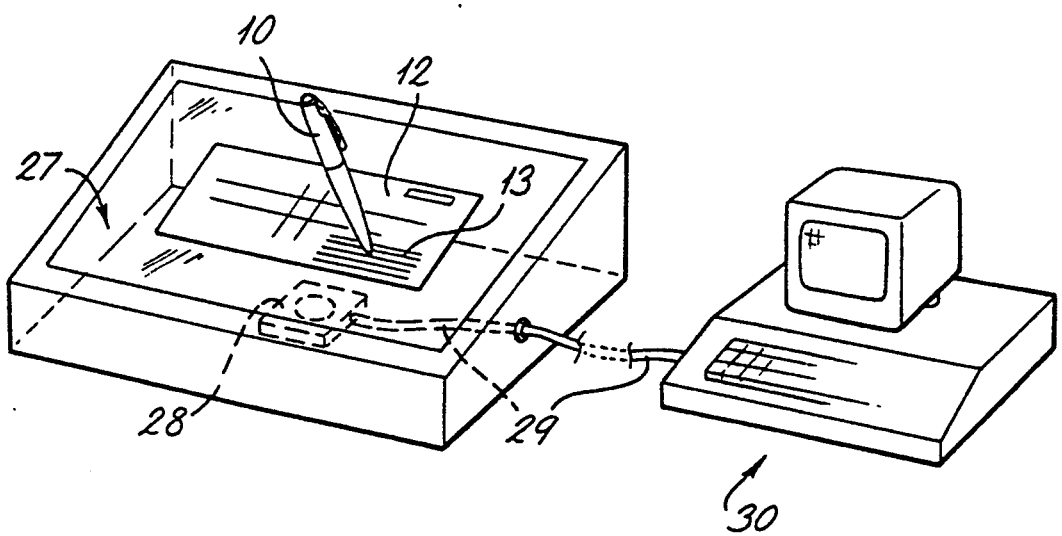
Figure 5A:
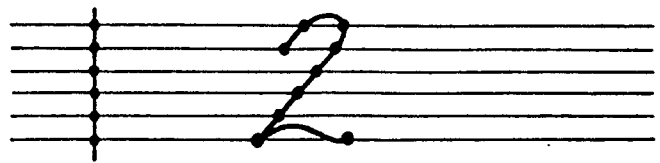
Figure 6:
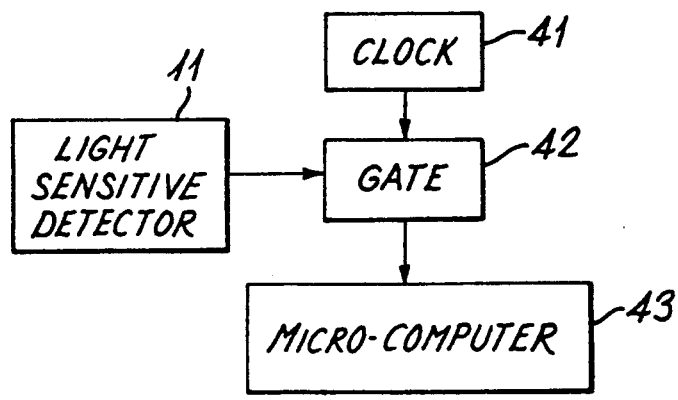
Figure 7:
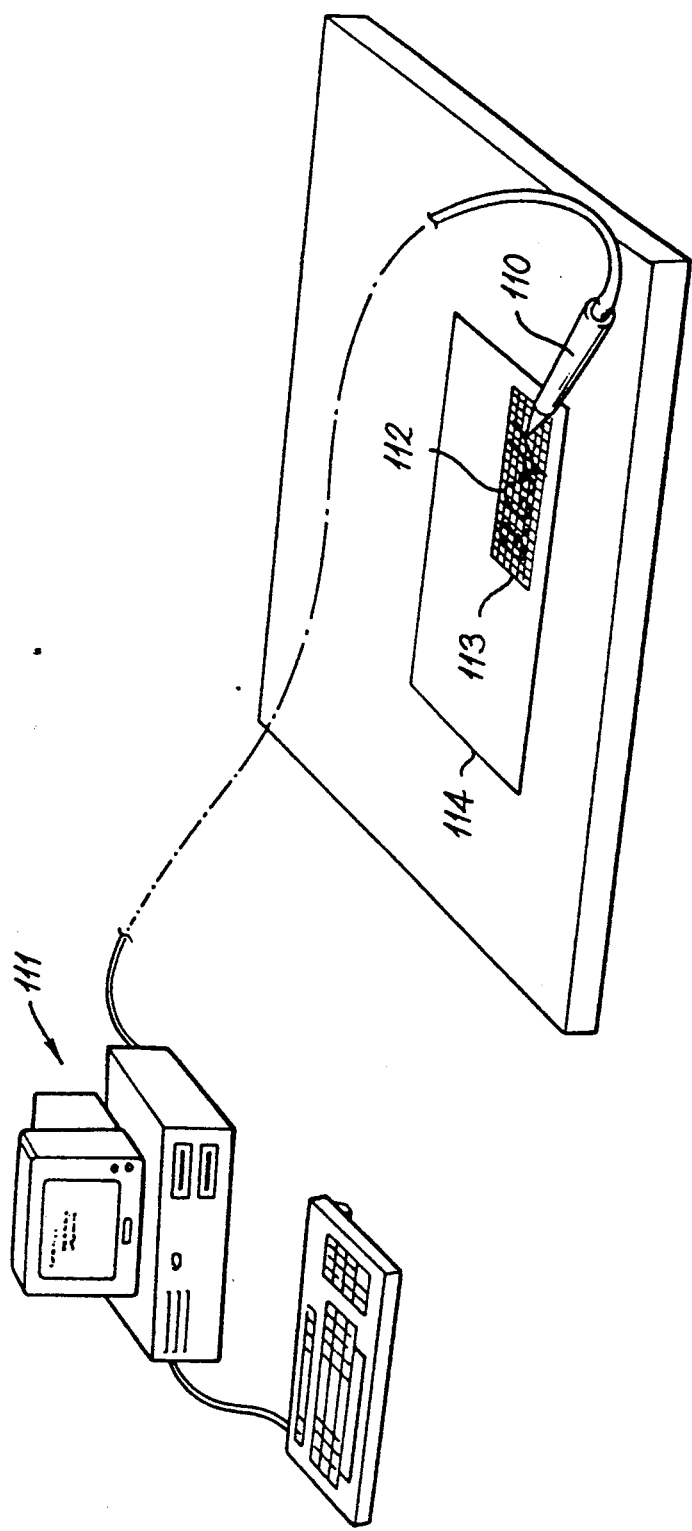
Figure 8:
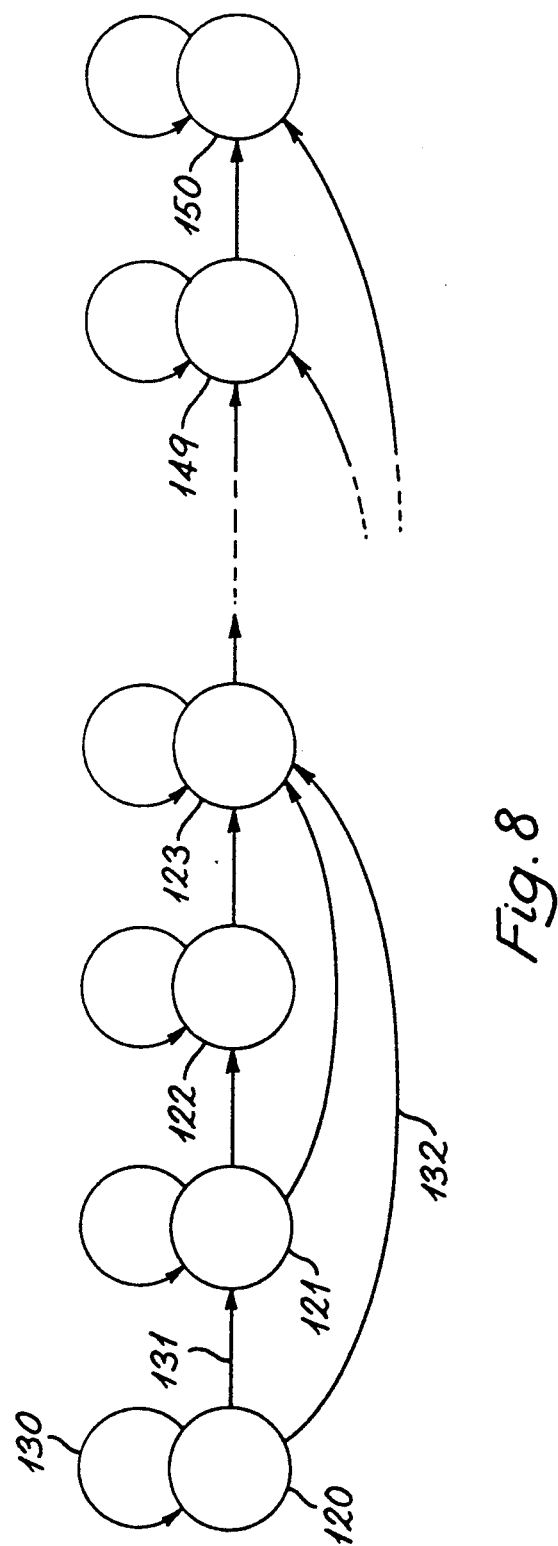
Figure 9:
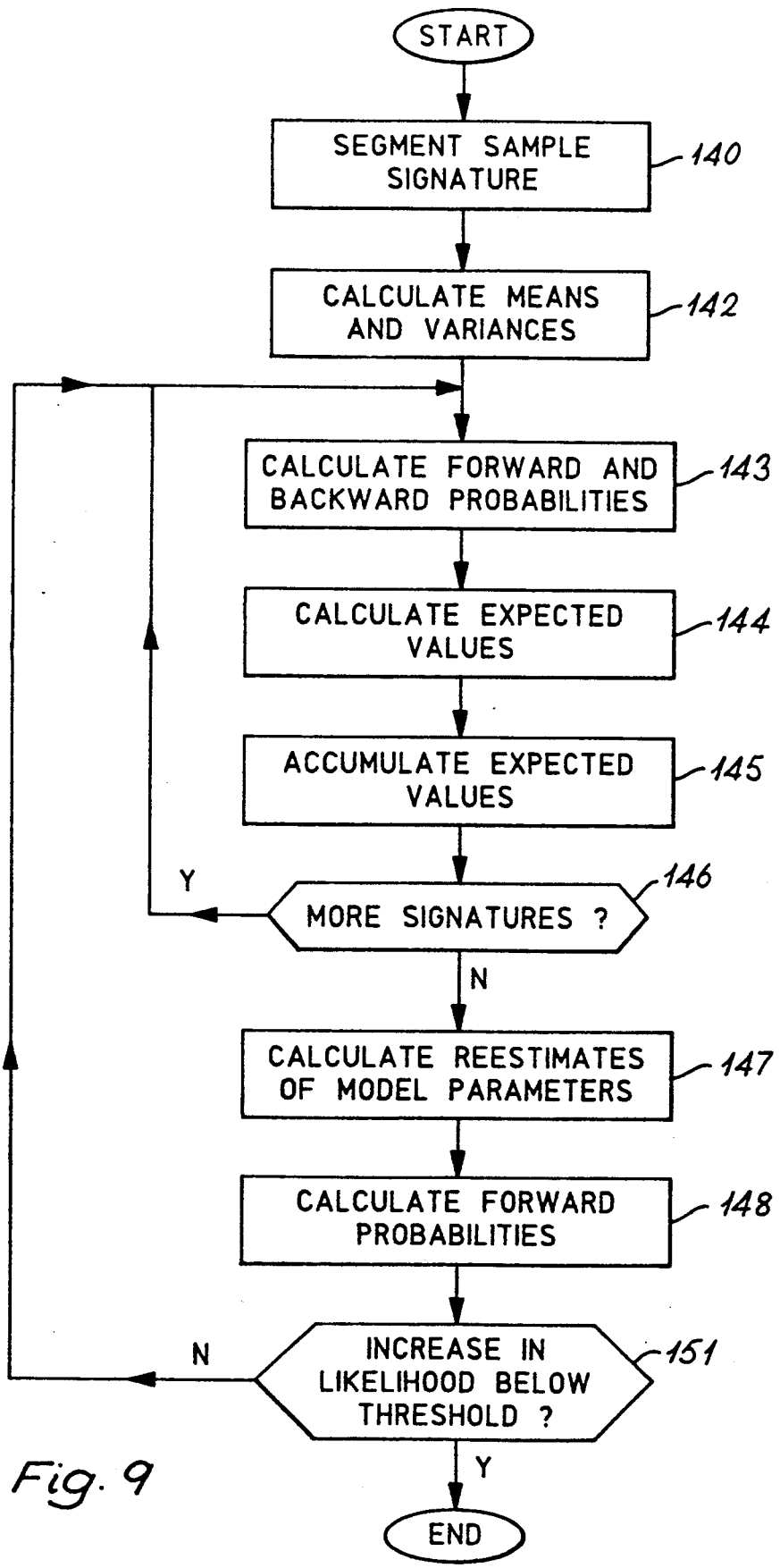
Figure 10:
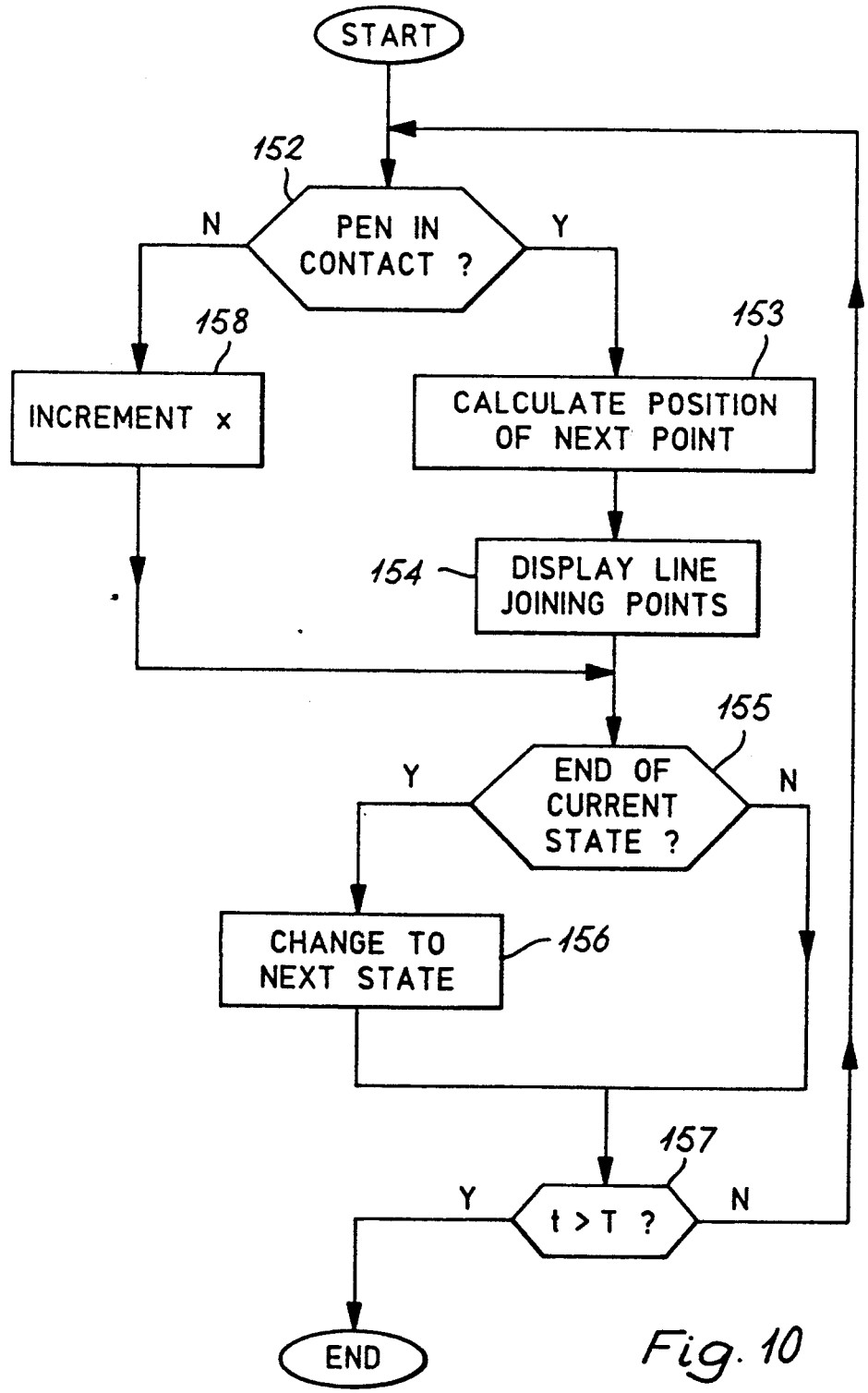

Certain embodiments of the invention will now be described by way of example with reference to the accompanying drawings, in which:

FIG. 1 is a cross-section of a writing instrument according to the invention,

FIG. 2 illustrates a surface which may be used with the writing instrument of FIG. 1, FIG. 3 is a cross-section of another writing instrument according to the invention, FIG. 4 illustrates a signature-verification terminal according to the invention, FIGS. 5(a), (b) and (c) are diagrams illustrating temporal analysis, FIG. 6 is a block diagram of apparatus for such analysis, FIG. 7 is a schematic diagram of apparatus according to the invention, FIG. 8 is a diagram of part of an HMM used to represent a signature, FIG. 9 is a flow diagram of an algorithm for generating HMMs from sample signatures, and FIG. 10 is a flow diagram of an algorithm for regenerating a signature from an HMM.

In FIG. 1 a pen 10 includes a light sensitive detector 11 which, when the pen is used to write on paper 12 (FIG. 2) having a grid of opaque lines 13 receives light reflected from the paper interrupted by crossing the lines in accordance with the way in which the pen moves across the paper. The pen has a tip 15 formed by a bundle of fibres which act as a writing tip receiving ink from a reservoir 14 by capillary action in which the ink moves down and/or between the fibres in the known way. At least one of the fibres in the bundle bypasses the reservoir 14 at 16 and channels light from the tip to the light sensitive detector 11. The fibres may be those used in known fibre tip or "fine line" pens; for example nylon fibres, but the light transmitting fibre or fibres may be glass fibres where the other material does not have sufficiently good light transmitting properties. The reservoir 14 is again conventional for fibre pens and is, for example, a cylindrical mass of absorbent felt or sponge-like material. Light received by the pen may be ambient but preferably the paper 12 is illuminated by an infra-red source (not shown) (which may be part of the pen but is usually separate) so that fluctuations in the ambient light do not affect the light signal received by the light sensitive detector 11.

Where the pen is used for signature verification, for example if the paper 12 is a cheque and the lines 13 are printed on the cheque where the signature is to be written, both static and dynamic features of the signature are available in the electrical signal at the output from the detector 11. The size of one portion of the signature relative to another (e.g. relative number of lines crossed in the two portions) is an example of a static feature while the number of lines crossed per unit time in forming a part of the signature provides an example of a dynamic feature. Analysis of such features in signature recognition is a well known technique, see for example British Patent No. 1480066.

Two examples of techniques which may be employed in deriving a signal representative of a signature are 'event sampling' and 'time sampling'. In the former, the times at which events, that is line crossings, occur are determined using a high speed clock circuit, and in the latter the output of the light sensitive detector 11 is sampled at a high sample rate, for example every 1/100$^{th}$ second, and stored. A 'high' output may occur when a line is sensed and 'low' outputs would then be generated between lines.

Preferably the person signing is asked to sign on a baseline, which is clearly marked, and in a given direction which is normally generally parallel to the lines.

In signature verification it is usually desirable that the trail left by the pen is visible but in some circumstances the ink used may be of a type which is visible only in light of specific wavelengths such as ultra-violet or after heating or on application of a substance which "develops" the trail.

The output from the detector 11 may be taken with or without amplification from the pen by means of a connection (not shown) to a computer for signal analysis, such as signature verification. However as shown in the present example it is preferable to eliminate any connection from the pen which may hamper writing and signing. For this reason the pen 10 includes an integrated circuit 17 powered by a battery 24 and connected to the detector 11. The circuit 17 may either carry out an analysis of the output, for example for signature verification when it includes a microprocessor or a gate array, or it may simply store the signals received, usually in digital form. If storage only is carried out, then after writing has been completed the pen may be placed in a special purpose stand (not shown) where electrodes 18 on the pen make contact with corresponding electrodes in the stand allowing transfer of the digitally stored signal for analysis by a computer coupled to the stand. The contacts 18 may be replaced by an electromagnetic induction link, a radio link, an ultrasonic link or ultra-violet or infra-red links.

In such an arrangement the pen can be very inexpensive and the computer, which is relatively costly, can service many "stands", i.e. data entry points. Thus an economical arrangement is achieved.

In some circumstances the battery 24 may be replaced by a capacitor, for example where a capacitor can be charged from the stand by way of contacts.

The pen shown in FIG. 1 includes a liquid crystal, or light emitting diode, display 20 which may be used to provide an output from the integrated circuit 17; for example giving instructions to the writer or giving the result of signature verification. The display 20 may be used for other purposes; for example to display a code indicating a function carried out by the circuit 17 and this function may be controlled by a microswitch 21 which, when present, is located at the top of the pen. A function which may be provided is that of a calculator when the integrated circuit 17 includes a microprocessor. Numbers and characters written by the pen are recognised and the result is displayed. For example "6×3" could be written and the display would then show "18".

Part of the pen, for example the top, or further internal integrated circuits, may form plug-in modules for signal storage or program purposes, such as signature verification, text processing, telephone number storage (where entry to the store is by a name written by the pen and the number is displayed by the display 20) or mathematical calculations.

When verification is carried out by the circuit 17 it is usually necessary to provide means for communicating the result of verification to other apparatus for example to allow or curtail the transfer of funds. Such communication may be as described above.

The ink is substantially transparent to at least some wavelengths of light received by the detector 11 and this is in contrast with the ink used to print the lines 13 which is opaque to such wavelengths.

Figure 5B:
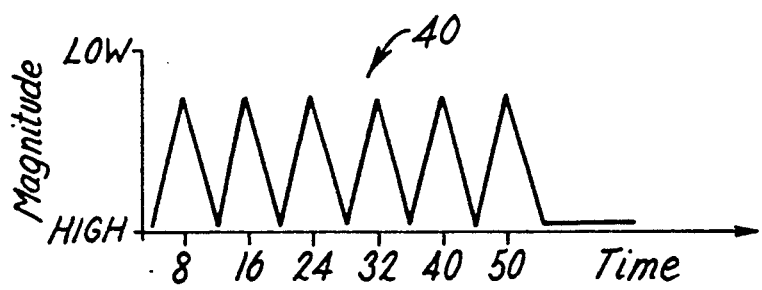
Figure 5C:
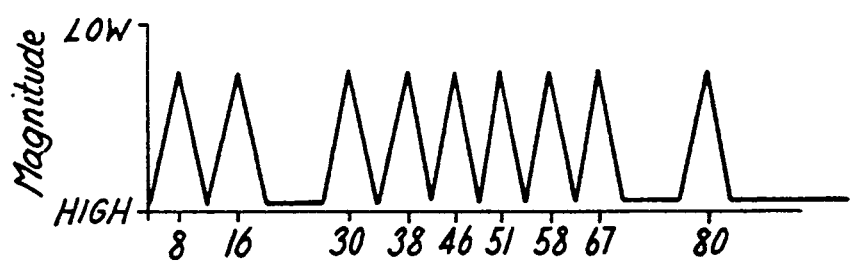

An example of the usage of the signals derived in the 'event sampling' mentioned above in temporal analysis for data entry is now given with reference to FIGS. 5(a), (b) and (c) and FIG. 6. If a "one" is written across the lines of FIG. 5(a) as a steady downstroke, a series of pulses 40 approximately evenly spaced in time results. Assuming a clock circuit 41 starts when the pen touches the paper, as sensed by a light level change at the light sensitive device 11, the peaks of these pulses might occur at the times shown by arbitrary units along the horizontal axis of FIG. 5(b). If a gate 42 is arranged to operate when a peak is detected, the times shown are gated to a microcomputer 43 which may form part of the integrated circuit 17 or part of a computer remote from the pen (which may then include the clock 41 and the gate 42). If now the number 2 shown in FIG. 5a is written, the pulse train of FIG. 5(c) may result with pauses after the first two pulses and before the last pulse, probably caused by inertia of the hand on changing direction.

The sets of pulses, and the times of their peaks, are distinct for the two numbers, and the times of peaks can be analysed by the microcomputer 43 to indicate which has been written. Analysis may, for example, include calculating the following for each number written:
(a) Total time (that is 50 for a "one" and 80 for a "two")
(b) The average pulse frequency (that is number of pulses divided by total time), and
(c) An analysis of the intervals between peaks (for example mean interval, standard deviation, distribution of long and short intervals).

Many other forms of analysis will be apparent to the informed reader such as other statistical procedures and Markov modelling (see below).

The analysed pulse patterns may be compared with stored vectors representing characters to be recognised in order to determine characters which have been written.

Similar procedures may be used for signature recognition although pulse patterns are more complicated and other characteristics can also be used in recognition. The stored vectors, in this case representing signatures to be recognised, are obtained (for example by the techniques mentioned above) from signatures written to "train" a recogniser. Such training procedures are well known.

Pens constructed as above may have a resolution of 1/72 of an inch or better giving a suitable number of line crossings (usually at least six) when a normal sized character is handwritten on paper having lines corresponding to this resolution (for example 36 lines per inch).

An alternative and usually preferable pen is shown in FIG. 3. In order to improve reception by the pen and to eliminate as far as possible all light except that reflected from the paper in the vicinity of the pen tip, the tip is formed by a convex-convex lens 34 which is in close proximity to a light guide 35 coupling the lens to the detector 11. The lens may be a sphere which forms a rolling ball-point for the pen. Ink 32 is held in a replaceable cartridge 33 which may include the transparent ball tip 34 and the central light guide 35. Where the material of the outer wall of a cartridge or the ink is sufficiently transparent or translucent to light received by the detector 11, the guide 35 may be omitted. The ball tip need not be part of the cartridge and may be in one of the usual forms for a ball pen, for example a roller ball in which the ball is pressed from the exterior of the pen into a nylon or plastics moulding, or a ball point where the ball is retained in a metal housing.

In another embodiment of the invention the light sensitive detector 11 is replaced by a light source, such as an infra-red source and the integrated circuit 17 is omitted. In use the paper 12 is reasonably transparent or translucent to light from the source in the pen but the lines 13 are not. Also the paper 12 is placed on a surface 27 (see FIG. 4) which is transparent or translucent to the light and a light sensitive detector 28 receiving light from the whole area containing the lines 13 is positioned under the surface. The detector 28 is connected by way of a connection 29 to a computer 30. As the ball 34 of the pen of FIG. 3 passes over the lines 13 light to the light sensitive detector under the surface is interrupted and the signal from the detector 28 is analysed by the computer 30, for example for signature verification. A lens such as a Fresnal lens may be used to focus light from the source on to the detector 28.

The detector 28 may, as an alternative, be placed closely adjacent to one edge of a sheet of material forming the surface 27. Light from the pen is then transmitted to the detector by refraction and internal reflection. In such an arrangement the box shown in FIG. 4 may not be required since the sheet may be placed directly on a supporting surface, with the detector 28 at one side.

In a further alternative the light sensitive detector 11, or light source, and the light guide 35 are replaced by an inductor (not shown) having an inductance which is affected by the material used in printing the lines 13. For example the lines may be printed in ferromagnetic ink and the replacement for the guide 35 may be a ferromagnetic core for the inductor which has one end positioned just above the ball 34 which in this embodiment is metallic. The circuit 17 is now constructed to respond to changes in the inductance of the coil and, as before, this circuit may be coupled by way of a connection between the pen and analysing circuits. Alternatively the circuit may store signals representative of inductance changes per unit time for access when writing has ceased by way of a special purpose stand, or for analysis within the circuit 17 of the pen. As mentioned above even where analysis is carried out within the pen it is usually necessary to make some contact with other apparatus in order to allow or prevent a process, such as funds transfer, from being carried out. The display 20 or another display on the pen may indicate that a transaction may be carried out.

The invention is also useful in granting access to restricted areas. In this application a position for writing a signature or a codeword may be positioned outside an entrance and the microswitch 21 may be replaced by an infra-red emitter or radio transmitter which generates a signal representative of a digitised version of the signal received by the light sensitive detector 11, the digitised version being stored by the integrated circuit 17. At the beginning of each day or other convenient time period the holder of the pen is required to write his signature, the stored contents of the circuit 17 being automatically dumped at the end of the chosen period. However once the output from the infra-red emitter has been recognised as representing an authorised signature or code the pen can be used to gain access again without writing a signature simply by causing the infra-red emitter or radio transmitter to transmit signals based on the stored signals held by the circuit 17.

The pen may include an infra-red, or other receiver, and may store information which is updated by way of the receiver. For example the pen may store a personal balance, and when access is authorised by a signature formed using the pen at a terminal the stored information may be updated by transmissions from the terminal, and indicated using the display 20.

In the previous application and in others the optical components of the pen may be used to read a bar code and the bar coding may be employed in reprogramming the integrated circuit 17. A bar code may also be read when the light detector is beneath the writing surface as in FIG. 4, transparent material on which the bar code appears then being placed on the surface. This facility may be used for many purposes including a change of the access code mentioned above. The code may comprise a signature plus a personal identification number which is reprogrammable as indicated. If the code written does not match the most recently entered code the infra-red emission from the top of the pen does not provide access to the restricted area and may instead cause an alarm to be given.

The pen according to the invention also has application for data entry. For example if a numerical input only is required a grid of lines 13 can be positioned on a paper form where an entry is required and the number of crossings of the grid is then sufficient to identify the digits as they are written on the form. Either of the two techniques mentioned above for deriving a signal representative of a signature may also be used to derive signals representative of the digits. Usually it will be most convenient in this application for the pen to be connected directly to processing circuits unless, of course, the arrangement of FIG. 3 is used, but where only a small amount of data is to be entered it can be stored in integrated circuit 17 and accessed when data entry has been completed. Bar code reading is useful in this application when a printed form is to be completed, since the pen may be passed over a bar code positioned on the form in front of the space where data is to be entered.

The bar code may represent a question being asked and/or it may be used for data entry and/or in organising the storage of data. Additionally the bar codes may represent screen or printer handling codes such as "carriage return".

The data capture technique can be extended to the entry of letters or other symbols.

The configuration of lines sensed may be other than that shown, for example parallel lines in another orientation or a rectangular grid giving information relating to movements in two directions may be used. Regular arrays of dots, particularly if arranged on a triangular or hexagonal basis, are also useful alternatives. Even an irregular but predetermined arrangement of lines or dots is suitable.

Preferably the two parallel sets of lines in a rectangular grid are in different respective colours. If the light source emits light in these two colours, lines in one direction transmit one colour while lines in the other direction transmit the other colour, while both colours are transmitted at intersections. Two light sensitive detectors are used, in the pen, or in a terminal similar to that of FIG. 4, each sensitive to light of one of the colours only. Movement in one direction is signalled by interruptions in light received by one detector and in the other direction by interruptions at the other detector. The output signals of the two detectors allow movement in the two directions to be analysed, for example by the circuit 17. Instead the colour sensitive detectors may be external to the pen when the two colour source is within the pen.

Direction information may also be obtained in a similar way from a grid in which the lines pass light polarised in respective directions, each detector being sensitive to light of one polarisation only.

The directions in which lines or arrays of dots are crossed may be sensed, if there is some characteristic of the lines or arrays which causes the modulation of light received to vary with the direction in which the pen is moved. The lines may be in groups when the lines in each group are spaced irregularly; for example in a group of three lines two may be relatively close together. The pen will then sense two lines crossed in close succession and then another rather later when crossing in one direction, and the opposite sequence when crossing in the other direction. Alternatively the lines in each group may be colour coded so that, for example, red and blue colours are sensed in close succession in one direction and blue and red in the other direction. Lines of differing widths (for example as few as two) may be employed in another arrangement.

In pens according to the invention the light source and/or light sensitive detector may be located in other positions and the light guide may be curved. The detector and/or source may be placed near the tip, especially where the 'pen' does not dispense ink.

Considering, now, signature recognition using HMMs, apparatus is first described for signature recognition or generating HMMs for signature recognition.

In the apparatus of FIG. 7 a pen 110 is used to write a signature 112 on a region 113 of a document 114 such as, in signature recognition, a cheque. The region 113 has closely ruled horizontal and vertical lines and the signature 112 is written over these lines. The pen may be in the form which provides analogue signals for a computer 111, if the computer is capable of analysing such signals to produce pulses which correspond to line crossings in the signature, or the pen itself may include some form of analogue-to-digital converter which provides pulses which correspond to line crossings. The horizontal lines in the area 113 are a different colour from the vertical lines in that area and the pen 110 generates two analogue or digital signals, each corresponding to line crossings of one respective colour. Thus the computer 111 is able to derive two signals representative of the number of vertical and horizontal lines, respectively, crossed in unit time. The computer therefore has available digital signals representative of vertical and horizontal components of pen velocity as the signature is written. In addition the pen includes a pressure sensitive switch which indicates whether or not the pen tip is in contact with a surface on which the signature is written and, in this way, a "contact" signal is also supplied to the computer 111.

Many other types of graphical input tablet may be used to supply signals which can be analysed to derive vertical and horizontal components of pen-tip velocity (x and y velocities) and an indication of whether the tip is in contact with a writing surface or not. For example an input tablet which provides a stream of digital signals representative of the coordinates of the position of the pen tip when in contact with a writing surface may be used.

In order to generate an HMM of a signature the number of sample signatures, typically five, are written on a graphical input tablet, for example in the area 113 of FIG. 7, and digital signals representing vertical and horizontal velocity components for the whole signature are stored together with a digital "contact" signal.

These signals are used to generate an HMM of the signature by dividing each of the signals into, typically, 50 uniform-length segments and generating a 50 state HMM. The Bakis form of HMM is used in which, in this example, each of the states has three associated Gaussian probability density functions (pdfs), one for each input data dimension (that is x and y velocities and writing surface contact indicator). Each pdf is represented by a mean value and a variance and the Bakis form also requires transition probabilities between states to be zero except for transitions from a state to itself, and transitions from a state to two other specified states. A diagrammatic representation of such an HMM is partially shown in FIG. 8 with states represented by circles 120 to 123, 149 and 150. Non-zero transitions are represented by arrows, some of which, such as the arrow 130, point back to the state itself and represent transitions from a state to itself. Other arrows, such as the arrows 131 and 132, which join one state to another, represent transitions between states.

The computer 111 is programmed to hold a number of matrices, one of which is known as matrix A and has dimensions 50×3. This matrix contains real valued natural logarithms of probabilities of transitions from state i to state j where i and j index the matrix. The Bakis form requires only 150 non-zero matrix elements, three for each of the 50 states. The matrix B having dimensions of 50×3 contains mean and variance values of the state pdfs. A further matrix O, for input data, has dimensions 3×number equal to the number of digital signals expected from a signature of maximum length. The matrix O holds and stores the incoming input signals. The input signals representing a signature can be regarded as being in a number of frames, each containing 3 input signal values, x and y velocity and contact value, and one frame occurring each time values of these three signals are provided.

The HMM is generated by re-estimation from an initial model which, as mentioned above, has typically 50 states corresponding to 50 segments. All the transitions of the Bakis model have initial values of unity and the pdfs are represented by the means and variances of each of the x and y velocities and the contact value calculated for each of the initial 50 segments. Although the latter can in practice only take up the values "1" and "0" it is believed that the mean and variance values obtained are useful. At this point the HMM is stored in matrices A and B.

Thus in FIG. 9, the flow diagram for HMM generation, the first three operations are to segment the three input signals of one of the sample signatures into 50 segments (operation 140) and calculate the mean and variance for each segment of each input (operation 142). The "forward" or "alpha" probability values and the "backward" or "beta" probability values are calculated frame by frame, in an operation 143, using the Baum-Welch or forward-backward algorithm as described, for example, by L. A. Liporace in "Maximum likelihood estimation for multivariate stocastic observations of Markov sources", IEEE Transactions on Information Theory, 28: 729–734, 1982. Log probabilities are used and it is therefore necessary to add terms in many of the equations. This necessitates the use of an "addlog" function as described by Kingsbury (see appendix B of the paper by S. J. Cox, "Hidden Markov Models for Automatic Speech Recognition: Theory and Application", RSRE Memorandum No. 4135, Procurement Executive, Ministry of Defence, RSRE Malvern, Worcestershire, U.K.). The forward-backward algorithm is also described by Cox and by J. N. Holmes in his book "Speech Synthesis and Recognition", Van Nostrand Reinhold (UK) Co. Ltd. (1988), see Chapter 8. J. N. Holmes also mentions Kingsbury. The references to Liporace, Cox, Holmes and Kingsbury are hereby incorporated into this specification.

The forward and backward probabilities are stored in two matrices C and D, respectively, and the dimensions of these matrices are the number of states (usually 50)×the number of frames in a signature, that is one matrix element for the forward and backward probability of each state and each frame. Using these matrices an expected value for each of the transition probabilities and each of the means and variances for each state is calculated (operation 144) and stored in two further matrices known as exptrans (dimensions 50×3) and expB (dimensions 50×6). Storing these values is shown as an accumulation operation 145 since the operation is later repeated for the other signature samples when storing is replaced by accumulation.

The operations 143 to 145 are repeated using the three input signals from another sample signature. The expected values obtained are added in the operation 145 to the corresponding values in matrices exptrans and expB. The process of repeating the operations 143 to 145 is repeated with the three input signals from each remaining sample signature in turn until a test 146 determines that all the signature samples have been used.

The accumulated values are then used to calculate re-estimates of the values of the transitions, means and variances in an operation 147, this being a process akin to normalisation, the results being stored in the A and B matrices. The forward pass of the forward-backward algorithm is carried out in an operation 148 using the transition probabilities, means and variances from the operation 147, and then a test 151, which is explained below, is carried out. At this stage the test 151 causes a jump back to the operation 143. In repeating the operations 143 to 146, each sample signature is used again in turn by reading its three input signals into the matrix O. The operations 143 to 148 are repeated until, as indicated by the test 151, the increase in the likelihood of the data being produced by the model between successive iterations is below a value such that further iterations do not provide a worthwhile improvement. At this point the parameters stored in the A and B matrices define the final HMM. At each stage the likelihood of the data being produced by the model is given by the value in the last cell of the C matrix (forward probabilities), that is the matrix element corresponding to the last state in the HMM.

Having described the generation of HMMs for signatures, signature verification will now be considered.

The signatory signs on using, for example, an apparatus of the type shown in FIG. 7 or another apparatus from which x and y velocity signals and contact signals can be generated. Although in signature verification for large-scale applications such as in banking only the pen 110 and the area 113 need to be specially provided since a general purpose computer such as one already installed for such applications can be used to calculate the probability of an unknown signature being genuine.

For verification, the parameters of the HMM derived from the sample signatures are stored in equivalents of the A and B matrices but the arrays expB, exptrans and D are not required.

The probability of the new trial signature data having been generated by the stored HMM is now calculated and can be expressed as P(O|M) which means the probability of the set of observations O occurring given values defining a Markov model M.

If $O_1, O_2 \cdots, O_T$ are observations corresponding to frames of the input signals and N is the number of states in the model, then the probability of the joint event of emitting the partial observation sequence $O_1, O_2 \cdots, O_t$ and occupying state $S_j$ at time t is given by $$\alpha_t(j) = P(O_1, O_2 \cdots, O_t, \text{(state } S_j \text{ at time t)}|M).$$

Then the completed forward probability pass yields $$P(O|M) = \sum_{j=1}^{N} \alpha_T(j)$$

The x velocity, y velocity and contact signals from the trial signature and the stored HMM parameters are used in a forward pass of the forward-backward algorithm to calculate P(O|M) and the last element in the matrix C provides this value when the forward pass is complete. The probability found is tested against a threshold and the signature is rejected or accepted as a result of this test.

Whether a signature should be accepted at a given level of probability is one which will depend on the application concerned; for example in banking it may be more acceptable to have a threshold probability for acceptance which allows a small percentage of forgeries to be accepted but gives a lower percentage of false rejections. Forgeries are, on the whole, unlikely and in any case most would be discovered by such a threshold level while false rejections create bad feeling against a system if they occur often with genuine users. In another application, such as access to security premises, a lower threshold of pulse acceptances might be better since false rejections can be tolerated by suitably instructed staff. Thus setting the probability threshold for acceptance is a matter of the application concerned but it is also necessary to set the threshold heuristically.

Another aid to recognition is the possibility of regenerating a representation of a genuine signature so that it can be displayed, for example, on a computer screen. Such a display is useful where acceptance or rejection of a signature is not to be carried out entirely on the basis of the results of calculation but is partly at the discretion of the person present at the time the signature is written or produced. The regenerated signature may also be used as a convenient method of electronic signature storage and in such circumstances authorisation of a signature may be made solely by a person present on the basis of the regenerated signature.

In reproducing the signature it is assumed that the states are arranged in a linear chain and the duration of each state is proportional to the reciprocal of probability of transition from that state back to the same state. These durations are calculated and stored before regeneration, together with the total signature time which is the sum of the state durations.

A signature can be regenerated from the mean values of x velocity, y velocity and surface contact held by the HMM for that signature; that is in the B matrix. A test 152 is then carried out to determine whether the mean value of the contact signal of the first state of the HMM is equal to, or greater than one. If so the pen is in contact with the writing surface and a line joining a start point to a next point in the signature can be displayed, when calculated. For this purpose the means of the x velocity, y velocity for that state are retrieved and the position of the next point is calculated (operation 153) and a line joining the start point and the next point is displayed (operation 154). A test 155 now determines whether the next state shall be used to determine the next point for line construction on the basis of the stored duration of the current state. If a change is to be made an operation 156 retrieves the mean values of the next state. A test 157 now follows to decide if the current duration t of the regenerated signature is greater than the calculated total duration T and if not a return to the test 152 occurs. Each time this test indicates that the pen is not in contact with the writing surface, the x coordinate of the start of the next line to be displayed is incremented by a convenient amount (operation 158). If the test 152 indicates contact between pen and writing surface the operations 153 and 154 occur and the next line forming the regenerated signature is displayed. In this way by moving through the HMM states by means of the tests 152, 155 and 157, and the operations 153, 154, 156 and 158, lines forming the whole regenerated signature are eventually displayed.

When a signature is regenerated in this way and a break appears the position chosen to continue the signature is usually incorrect. However, a good idea of the original can be obtained, especially by a person with a little experience. The signature to be authenticated may also be modelled by an HMM and regenerated in the same way so that the two regenerated signatures can be compared by eye or automatically. The problem of breaks in regenerated signatures can be overcome when absolute position of the pen tip is also known, for example when the input tablet is in a form which provides x and y coordinates since mean values of x and y positions are available to determine the position of the next point after a break.

As an alternative to displaying lines, the regenerated signature may be made up by displaying only the points calculated.

Having described several specific embodiments of the invention, it will be clear that the invention can be put into practice in many other ways. For example other dynamic features of a signature may be used in providing variables for the pdfs and non-dynamic features such as pen position may also be included. One pen tip velocity component, only, may be used, preferably in combination with another dynamic or static feature of the signature.

The HMM model may be simplified from the Bakis form by allowing only probabilities from a state to itself or to the next state in the model and different techniques may be used to form the HMM from the sample signatures.

A known alternative to the Baum-Welch algorithm for HMM re-estimation is the Viterbi algorithm and this algorithm may therefore be used both for deriving the HMM model itself and for calculating probability in verification.

We claim:

1. A method of verifying a signature comprising the steps of:
   using modeling means to generate a representation of a signature from data representing a finite state machine previously derived from a plurality of genuine signatures; and
   comparing the generated signature with a trial signature to be verified in rejecting or accepting the trial signature.

2. Apparatus for use in signature verification comprising:
   modeling means for storing data defining the states of a finite state machine model of a signature; and
   means for generating a display of a representation of the signature from at least some of the stored data; whereby a signature to be verified can be compared with said representation.

3. A method of generating a representation of a signature comprising the steps of:
   retrieving a series of values from stored data representing a finite state machine derived by modeling means from examples of the signature written using a writing instrument with a tip, each value being at least one of a number of values defining states of the finite state machine, and the values in the series being retrieved from the stored data and representing successive states of the finite state machine; and
   generating a series of visible points and/or lines in a representation of the signature from the series of values.

4. A method according to claim 3 wherein the values in the series comprise a series of mean velocities of a pen tip writing an authentic signature;
   said generating step comprising a step of generating the visible points and/or lines by calculating point positions from the mean velocities.

5. A method according to claim 3 wherein the number of visible points and/or lines generated from the stored data representing each state of the finite state machine depends on the reciprocal of the probability of transition from that state back to the same state.

6. A method according to claim 3 wherein the values stored and retrieved include, for each state of the finite state machine, two mean tip velocity components and the probability of transition back to that state, said generating step comprising the steps of:
calculating a duration using the reciprocal of said probability of transition for that state; and
generating a line having a direction dependent on the velocity components for that state and a length dependent on said duration and said velocity components.

7. A method according to claim 6 wherein the values stored and retrieved include, for each state, the mean value of a contact signal indicating whether the tip is in contact with a writing surface, said generating step including the step of:
generating a line for a state only when the contact signal has a predetermined relationship to a threshold value.

8. Apparatus for generating a representation of a signature comprising:
modeling means for retrieving a series of previously stored values from data representing a finite state machine, each value being at least one of a number of values defining states of the finite state machine, and the values in the series being retrieved from said data and representing successive states of the finite state machine; and
means for generating a series of visible points and/or lines as a representation of the signature from the series of values.

9. A method of automatic signature verification comprising, for each signatory, the steps of:
using modeling means for deriving and storing finite state machine data representing a finite state machine particular to the signatures of a specific signatory based on corresponding measurements of a plurality of signatures from the specific signatory written on a writing surface carrying parallel lines, the measurements of each signature comprising discrete velocities of the tip of a writing instrument used to write the said plurality of signatures determined from the rate at which the said lines are crossed by said tip, each state of the finite state machine being defined at least partially by a mean tip velocity component particular to that state; and
verifying signatures by comparing the finite state machine data with data from signatures alleged to be written by the signatory.

10. A method according to claim 9 wherein the said measurements include two components of the said velocity in directions normal to one another, the surface has two sets of parallel lines with the lines of one set of lines normal to those of the other, and the sets of lines are such that crossing the lines of one set of lines by the said tip can be distinguished from such crossings of the other set of lines.

11. A method according to claim 9 wherein the data represents a finite state machine having between thirty and one hundred states.

12. A method according to claim 9 wherein the data represents a hidden Markov model (HMM).

13. A method according to claim 12 wherein each state of the HMM has not more than two transitions to other states.

14. A method according to claim 9, said using step comprising the steps of:
deriving one signal representing each said measurement;
dividing each signal into an equal number of segments; and
deriving the data to represent a finite state machine with a number of states dependent on the number of segments.

15. A method according to claim 9 wherein the states of the finite state machine are defined by at least one probability density function (pdf) represented by the mean and variance of a Gaussian distribution.

16. A method according to claim 15 wherein each mean and variance for each state relate to the velocity of the said tip in a said segment which relates to that state.

17. A method according to claim 9, further comprising the step of:
carrying out a further measurement on each signature used to derive the data, said further measurement indicating whether said tip is in contact with a writing surface on which said plurality of signatures is written.

18. A method according to claim 9, said using step comprising the steps of:
calculating the forward and backward probabilities from signals representing one of the plurality of signatures and an initial form of the finite state machine data based on measurements from one of the plurality of signatures;
re-estimating values defining the finite state machine data from the forward and backward probabilities;
repeating the step of calculating forward and backward probabilities and re-estimating values using the initial form of the finite state machine data and input signals from each of a number of the plurality of signatures while accumulating re-estimated values defining the finite state machine data;
deriving values re-defining the finite state machine data from the accumulated values;
accumulating a plurality of re-estimated values defining the finite state machine data by repeatedly calculating the forward and backward probabilities from the re-defined form of the finite state machine data and input signals from each of a number of the plurality of signatures;
deriving values re-defining the finite state machine data from the accumulated values;
continually repeating the steps of accumulating re-estimated values and calculating the forward probability and deriving values re-defining the finite state machine data until the increase in the forward probability calculated for the final state falls below a predetermined threshold, the last said values derived then defining the final version of the finite state machine data.

19. A method according to claim 9, said verifying step comprising the steps of:
calculating the forward probabilities from the finite state machine data and measurements from a trial signature to be verified which correspond to the measurements from which the finite state machine data was derived; and
comparing the forward probability calculated for the final state with a predetermined threshold value to determine whether to accept or reject the trial signature.

20. Apparatus for signature verification comprising:

velocity-measuring means for determining the velocity of the tip of a writing instrument used to write signatures on a writing surface carrying parallel lines by determining the rate at which the said lines are crossed by the said tip;

modeling means for deriving and storing sets of data representing a respective finite state machine for the signature of each person whose signature is to be recognized by the apparatus, each set of data being based on measurements on a plurality of signatures from one said person written on a writing surface carrying parallel lines and the measurements of each signature comprising discrete velocities of the tip of a writing instrument used to write the said plurality of signatures as determined by the said velocity measuring means, and each state of each finite state machine being defined at least partially by a mean tip velocity component particular to that state; and means for verifying signatures based on the sets of stored data.

21. Apparatus according to claim 20 wherein the modeling means is arranged to derive finite state machine data for each signature which represents a finite state machine having between thirty and one hundred states.

22. Apparatus according to claim 20 wherein:

the velocity-measuring means determines the components of the velocity of the said tip in two directions at right angles when used to write signatures on a writing surface carrying two sets of parallel lines with the lines of one set at right angles to the lines of the other set; and the modeling means is arranged to use the said components in deriving said sets of data.

23. A method of modeling a signature comprising the steps of:

obtaining corresponding measurements from a plurality of signatures from one signatory written on a writing surface carrying parallel lines, the measurements on each signature comprising discrete velocities of the tip of a writing instrument used to write the said plurality of signatures determined from the rate at which said parallel lines are crossed; and using modeling means to define data representing a finite state machine particular to that signatory based on the measurements obtained, each state of the finite state machine being defined at least partially by a mean tip velocity component particular to that state.

24. Apparatus for deriving a finite state machine modelling a signature comprising:

velocity-measuring means for determining the velocity of the tip of a writing instrument used to write signatures on a writing surface carrying parallel lines by determining the rate at which the said lines are crossed by said tip; and modeling means for deriving and storing data representing a finite state machine particular to one signatory based on corresponding discrete velocity measurements obtained using the velocity-measuring means from a plurality of signatures from that signatory, each state of the finite state machine being defined at least partially by a mean tip velocity component particular to that state.

25. A method of verifying a signature comprising the steps of:

obtaining measurements from a signature to be verified written on a writing surface carrying parallel lines, the measurements comprising discrete velocities of the tip of a writing instrument used to write the signature determined from the rate at which said parallel lines are crossed;

determining the probability that the said measurements could have been generated by a finite state machine represented by stored data derived by modeling means from at least one genuine signature, each state of the finite state machine being defined at least partially by a mean tip velocity component particular to that state; and accepting or rejecting the signature on the basis of the probability determined.

26. Apparatus for verifying a signature comprising:

means for obtaining measurements from a trial signature to be verified written on a writing surface carrying parallel lines, the measurements comprising discrete velocities of the tip of a writing instrument used to write the signature determined from the rate at which said parallel lines are crossed;

means for determining the probability that said measurements could have been generated by a finite state machine represented by stored data derived by modeling means from at least one genuine signature, each state of the finite state machine being defined at least partially by a mean tip velocity component particular to that state; and means for accepting or rejecting the signature on the basis of the probability determined.

27. Apparatus according to claim 26 wherein:

the means for determining the said probability calculates the forward probability of the final state of the finite state machine from the stored finite state machine data and the measurements from the trial signature; and the means for accepting or rejecting the signature uses the forward probability calculated for the final state to determine whether the trial signature is to be accepted or rejected.

* * * * *